US006826171B1

(12) United States Patent
Mueckenheim et al.

(10) Patent No.: US 6,826,171 B1
(45) Date of Patent: Nov. 30, 2004

(54) PACKET TRANSMISSION IN MOBILE TELECOMMUNICATIONS SYSTEMS

(75) Inventors: Jens Mueckenheim, Nuremberg (DE); Patrick Charriere, Tetbury (GB); David Lahiri Bhatoolaul, Grange Park (GB); Qiang Cao, Abbey Meads (GB); Seau Sian Lim, Swindon (GB)

(73) Assignee: Lucent Technologies Inc., Murray Hill, NJ (US)

( * ) Notice: Subject to any disclaimer, the term of this patent is extended or adjusted under 35 U.S.C. 154(b) by 735 days.

(21) Appl. No.: 09/713,178

(22) Filed: Nov. 15, 2000

(30) Foreign Application Priority Data

Nov. 23, 1999 (EP) ............................................ 99309308

(51) Int. Cl.⁷ ............................................... H04B 7/212
(52) U.S. Cl. ......................... 370/347; 370/328; 455/522
(58) Field of Search .............................. 370/310, 312, 370/328, 329, 342, 349, 431, 445–463, 347, 344, 229, 441, 252, 332; 455/522, 525

(56) References Cited

U.S. PATENT DOCUMENTS

| | | | | |
|---|---|---|---|---|
| 5,490,144 | A | * | 2/1996 | Tran et al. .................... 370/238 |
| 5,706,274 | A | * | 1/1998 | Angelico et al. ............ 370/445 |
| 5,754,541 | A | * | 5/1998 | Glisic et al. ................. 370/335 |
| 6,078,568 | A | * | 6/2000 | Wright et al. ................ 370/312 |
| 6,195,338 | B1 | * | 2/2001 | Decker ......................... 370/252 |
| 6,240,083 | B1 | * | 5/2001 | Wright et al. ................ 370/348 |
| 6,310,872 | B1 | * | 10/2001 | Almgren et al. ............. 370/349 |
| 6,317,435 | B1 | * | 11/2001 | Tiedemann et al. ......... 370/441 |
| 6,426,960 | B2 | * | 7/2002 | Antonio ........................ 370/477 |
| 6,584,325 | B1 | * | 6/2003 | Shakhgildian ............... 455/525 |

FOREIGN PATENT DOCUMENTS

WO     WO 98/23109     5/1998     ............ H04Q/7/22

OTHER PUBLICATIONS

M. Chuah, Q. Zhan, O. Yue, Access priority schemes in UMTS MAC, Wireless Communications and Networking Conference (WCNC 1999), Sep. 21–24, 1999, IEEE, vol. 2, pp. 781–786.*

Qiang Cao, Medium Access Control (MAC) for Wide–Band CDMA Systems with Optimal Throughput, 48th IEEE Vehicular Technology Conference (VTC 1998), May 18–21, 1998, IEEE, vol. 2, pp. 988–992.*

(List continued on next page.)

*Primary Examiner*—Huy D. Vu
*Assistant Examiner*—Lee Khuong

(57) ABSTRACT

A practical and efficient persistency control for the Universal Mobile Telecommunications System, comprising determining a persistency value for making random transmissions for access to the system, the method comprising:

1. determining for a system cell, the maximum allowable user equipment transmission power $P^{MAX}$;
2. assessing the number in a current time interval of ongoing packet transmissions $N_{CURRENT}$ based upon a fraction α of user equipment measured current transmission power $P_{total}$;
3. assessing the power available in a next time interval based upon the maximum allowable transmission power and the current transmission power, and determining therefrom a number of allowable new packets $N_{NEXT}$ in the next time interval; and
4. determining a persistency value p for transmission to user equipment in said cell, being a function of the number of ongoing packet transmissions $N_{CURRENT}$ and the number of allowable new packets $N_{NEXT}$.

17 Claims, 2 Drawing Sheets

OTHER PUBLICATIONS

Hua Xu, CDMA (IS–95A) Access Channel Performance Analysis, IEEE VTS 50th Vehicular Technology Conference VTC 1999 Sep. 19–22, 1999, IEEE, vol. 1, pp. 426–430.*

Seau Sian Lim, Qiang Cao, Cristian Demetrescu, David J. Reader and Jie Lin, 3rd Generation RACH Transmission—A Candidate, IEEE 49th Vehicular Technology Conference, May 16–20, 1999, IEEE, vol. 1, pp. 140–144.*

Yile Guo, Capacity of Multi–class Traffic CDMA System with Muituser Receiver, Wireless Communications and Networking Conference (WCNC 1999), Sep. 21–24, 1999, IEEE, vol. 1, pp. 500–504.*

Meng–Hsuan Chung and Kwang–Cheng Chen, Power Allocation for Multi–Rate Multiuser Detection in Wideband CDMA System IEEE VTS 50th Vehicular Technology Conference (VTC 1999), Sep. 19–22, 1999, vol. 1, pp. 608–612.*

Seong–Jun Oh and Kimberly M. Wasserman, Adaptive Resource Allocation in Power Constrained CDMA Mobile Networks, Wireless Communications and Networking Conference (WCNC 1999), Sep. 21–24, 1999, IEEE, vol. 1, pp. 510–514.*

J. Dunlop, "Packet access mechamisms for cellular radio" "Electronics & Communications Journal" London, GB, Jun. 5, 1993, pp. 173–179.

European Search Report, dated May 3, 2000.

* cited by examiner

US 6,826,171 B1

PACKET TRANSMISSION IN MOBILE TELECOMMUNICATIONS SYSTEMS

CROSS-REFERENCE TO RELATED APPLICATION

This application claims priority of European Patent Application No. 99309308.7, which was filed on Nov. 23, 1999.

FIELD OF THE INVENTION

This invention relates to mobile telecommunications systems, particularly though not exclusively the Universal Mobile Telecommunications System (UMTS).

DESCRIPTION OF THE RELATED ART

Packet transmission is a key feature of the UMTS as defined by the 3GPP™ standard. Methods to make the packet transmission efficient are required on both Downlink and Uplink. On the Downlink the radio access network has complete knowledge of how much, when, and to whom the packet transmissions are made. Hence a central control can be used for the Downlink packet transmission, for example, through a scheduler in the radio access network side to schedule the Downlink packet transmission.

For Uplink packet transmission where all mobile users are uncoordinated, a fully central controlled method (e.g., scheduling based method) on the Uplink is not feasible. There is therefore a procedure set forth in the MAC protocol specification for UMTS for gaining transmission access by making random packet transmissions on a random access channel (RACH) and detecting, according to a CDMA (Collision Detect Multiple Access) process, whether the packet transmission is received and acknowledged by the receiver. If the transmission is unsuccessful, the transmitter makes another attempt after a random time interval. The probability of gaining access is dependent on the number of other stations making transmissions, and, where a station is unsuccessful, the time interval for making another attempt is lengthened according to a persistency value, which is derived by the Radio Access Network from the traffic volume. Thus, Uplink packet transmission may be controlled through persistency broadcast on the Downlink to the User Equipment (UE). Persistency probability is updated and available for Uplink packet transmissions on the Random Access Channel and Common Packet Channel (RACH/CPCH).

Hence the principle of persistency control is that the radio access network monitors the Uplink traffic load and broadcasts a persistency value on the downlink Broadcast Control Channel. Based on the persistency broadcast information, UEs decide their (re) transmission probability, so that the packet access on RACH/CPCH is controlled.

The 3GPP Standard for UMTS is however silent as to the implementation of persistency control.

SUMMARY OF THE INVENTION

It is an object of the present invention to provide a practical and efficient persistency control algorithm for a mobile telecommunications system, based on specific measurement values provided by the system, and which avoids tedious computation.

In a first general aspect, the present invention provides, in a mobile telecommunications system, a method of determining a persistency value for making random transmissions for access to the system, the method comprising:

1. determining for a system cell, the maximum allowable user equipment transmission power $P^{MAX}$; characterised by:

2. assessing the number, in a current time interval, of ongoing packet transmissions $N_{CURRENT}$ based upon a fraction a of measured current transmission power $P_{total}$;

3. assessing the power available in a next time interval based upon the maximum allowable transmission power and the current transmission power, and determining therefrom a number of allowable new packets $N_{NEXT}$ in the next time interval; and 4. determining a persistency value p for transmission to user equipment in said cell, being a function of the number ongoing packet transmissions $N_{CURRENT}$ and said number of allowable new packets $N_{NEXT}$.

In a second general aspect, the invention provides in a mobile telecommunications system, apparatus for determining a persistency value for making random transmissions for access to the system, the apparatus comprising:

means for providing for a system cell, the maximum allowable user equipment transmission power $P^{MAX}$;

means for measuring user equipment current transmission power $P_{total}$; characterised by:

means for assessing the number in a current time interval of ongoing packet transmissions $N_{CURRENT}$ based upon a fraction $\alpha$ of measured current transmission power $P_{total}$;

means for assessing the power available in a next time interval based upon the maximum allowable transmission power and the current transmission power, and determining therefrom a number of allowable new packets $N_{NEXT}$ in the next time interval; and means for determining a persistency value p for transmission to user equipment in said cell, being a function of said number of ongoing packet transmissions $N_{CURRENT}$ and said number of allowable new packets $N_{NEXT}$.

In a more specific aspect, the invention provides in the Universal Mobile Telecommunications System, a method of determining a persistency value for making random transmissions for access to the system, the method comprising;

1. determining for a system cell, the maximum allowable user equipment transmission power $P^{MAX}$; characterised by:

2. assessing the number in a current time interval of ongoing packet transmissions $N_{CURRENT}$ based upon a fraction $\alpha$ representing the user equipment measured current transmission power $P_{total}$; wherein $P_{total}$ includes power from both packet Transport Channels ($\alpha.P_{total}$) and power from circuit traffic Dedicated Transport Channels($(1\alpha)$ $.P_{total}.$)

3. assessing the power available in a next time interval based upon the maximum allowable transmission power and the current transmission power, and determining therefrom a number of allowable new packets $N_{NEXT}$ in the next time interval; and 4. determining a persistency value p for transmission to user equipment in said cell, being a function of said number of ongoing packet transmissions $N_{CURRENT}$ and said number of allowable new packets $N_{NEXT}$.

Said fraction $\alpha$ may have any value of one or less than one. As preferred, said persistency value p is determined on the assumption that all ongoing packet transmissions $N_{CURRENT}$ will continue in the next time interval. Said persistency value p is preferably determined on the assumption that all ongoing packet transmissions $N_{CURRENT}$ and all said number of allowable new packets $N_{NEXT}$ have an equal possibility of transmission. In a preferred arrangement, the normalised persistency value p is equal to the inverse of the sum of said number in a current time interval of ongoing packet transmissions $N_{CURRENT}$ and said number of allowable new packets $N_{NEXT}$. (note that p is normalised value.)

The number of ongoing packet transmissions $N_{CURRENT}$ is determined on the assumption that each packet is controlled to have the same power $P_{RACH}$, whereby $N_{CURRENT} = \alpha \cdot P_{total}/P_{RACH}$. The number of allowable new packets $N_{NEXT}$ is determined on the assumption that each packet has the same power (at receiver side) $P_{RACH}$, whereby $N_{NEXT} = (P^{MAX} - P_{total})/P_{RACH}$. Thus, the persistency value p is given by $P_{RACH}(P^{MAX} + (1-\alpha) \cdot P_{total})^{-1}$.

An overall persistency probability is transmitted over the system cell, having been determined as the product of the normalised persistency value p and the number n of total access channels available for packet transmission.

For the Universal Mobile Telecommunications System measured current transmission power $P_{total}$ includes power from both packet Transport Channels ($\alpha \cdot P_{total}$) and power from circuit traffic Dedicated Transport Channels ($(1-\alpha) \cdot P_{total}$).

BRIEF DESCRIPTION OF THE DRAWINGS

A preferred embodiment of the invention will now be described with reference to the accompanying drawings, wherein.

DETAILED DESCRIPTION

Figure 1:
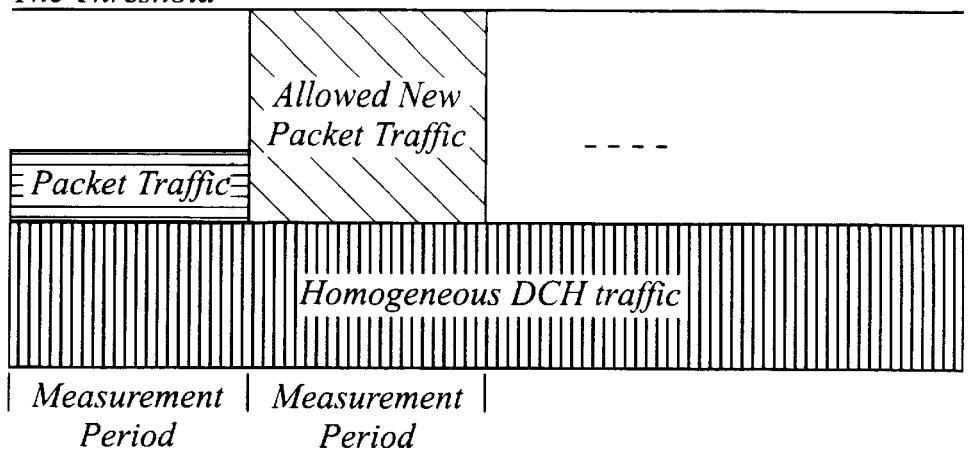
FIGS. 1 to 3 are schematic views showing different states of packet transmission within consecutive measurement time intervals, for the purpose of explaining the invention.

Given that the UMTS system provides the following features

Uplink load measurement power control (open/closed loop) for RACH/CPCH and maintained target signal to interference ratio (SIR)

packet channel usage factor;

the present invention functions:

to find a persistency value to control Uplink packet transmission such that radio resource is used efficiently without overloading the air interface.

The method of the present invention in a preferred embodiment, includes the following features, which are practical assumptions introduced for making a speedy and reliable computation:

Feature 1

Packet channel usage factor, $\alpha_{packet}$, is the resource consumption of RACH/CPCH. It reflects the ratio of packet traffic on RACH/CPCH over circuit traffic on DCH over the air. In fact, $\alpha_{packet}$ is a factor that affects the BTS hardware resources configuration. The value of $\alpha_{packet}$ is assigned by the radio resource allocation (RRA) procedure. It may be derived from packet/circuit traffic pattern, e.g., how much traffic on common channel and how much traffic on dedicated channel. This traffic pattern accordingly affects the hardware (Base Band Unit) resources allocation in determining how many BBUs should be allocated to receive/process RACH/CPCH signal and how many should receive/process DCH signal. Based on such a configuration, the BTS hardware can be efficiently utilised to process both packet traffic on RACH/CPCH and Circuit traffic on DCH.

Feature 2

UL load is the total received power for a carrier within the cell, $P_{total}$. This power is measured at BTS. It includes inter-cell interference and thermal noise.

Feature 3

Power on RACH/CPCH is controlled (either open loop or closed loop) such that target receive SIR can be maintained. This is done through RRC system information broadcast message, where power control info (including Uplink(UL) target SIR, primary common control physical channel (CCPCH) Downlink (DL) transmission (TX) power, UL interference, and a constant protection value) for the physical packet transmission channel is available for all mobiles. It actually assures that all RACH/CPCH packets are received at the same power at average.

Feature 4

As RACH/CPCH preamble length is much shorter than its message part, power fluctuation caused by the preamble to the total power measurement at BTS is negligible, compared to that caused by the Uplink transmission of the message part. Therefore, power measurement of RACH/CPCH is mainly from RACH/CPCH message part, rather than preamble part. Note that from Feature 3, the power can be calculated.

Feature 5

Transmission duration for a packet is much shorter than the duration for a circuit traffic transmission. From BTS's point of view, when a packet transmission finishes, circuit transmission is still going on. Circuit traffic is of homogeneous pattern.

Feature 6

In a cell, if RACH/CPCH is used for packet transmission, DCH will not be used for packet transmission. DCH will carry circuit switched services only. RACH is used for short packet transmission (e.g., single packet), whereas CPCH is used for larger amount of packet transmission (e.g., multiple packets).

Feature 7

Persistency probability is always available for RACH/CPCH transmissions. Both backlogged users and new users will (re) transmit with the same persistency probability. This is a typical DFT mode (Deferred First Transmission mode).

Feature 8

Worst case scenario is assumed to control the system stability by assigning packet traffic users sub-optimal (re) transmission probability.

There are three cases for packet transmission for deciding the (re) transmission probability.

CASE A (FIG. 1): all the current packet traffic is successfully transmitted. In next access slot, the total packet traffic will not include any current remained packet traffic at all. It obviously allows more new packet traffic come into the system. This is the best case.

Figure 2:
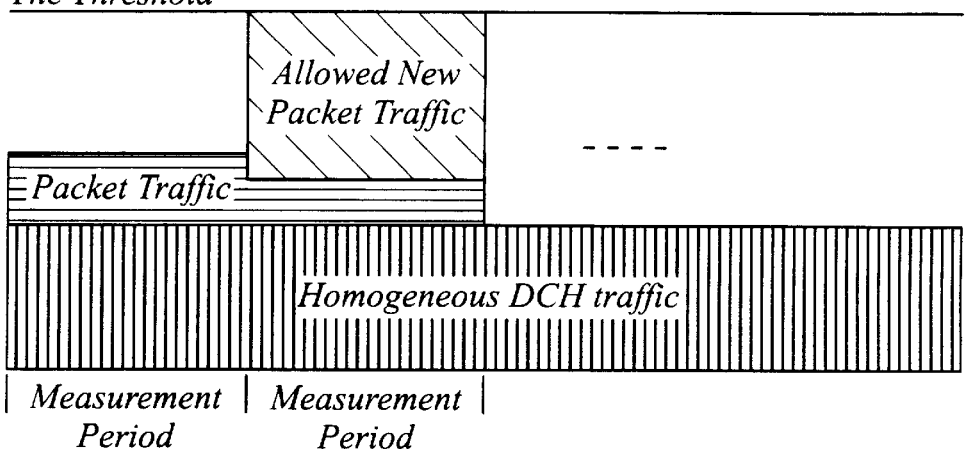

CASE B (FIG. 2): Only part of the current packet traffic can be transmitted successfully in the current time interval, the remaining packet traffic will have to be retransmitted. The total packet traffic in next access slot will have to include this part of traffic. This means that the total packet traffic the system can take is less than that of CASE A.

Figure 3:
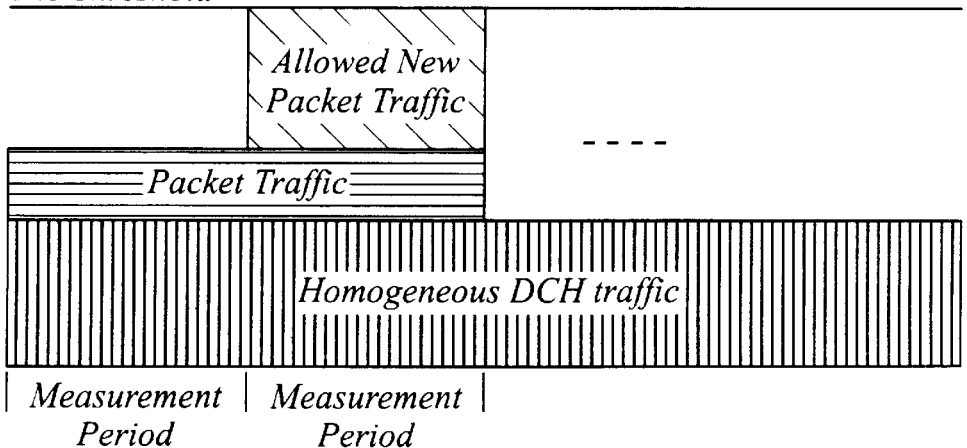

CASE C (FIG. 3): all the current packet traffic is unfortunately transmitted unsuccessfully. All of it will have to be retransmitted in next access slot. This means that the total packet traffic will have to include the retransmitted traffic and the new packet traffic that the system can take is even smaller than CASE B. This is apparently the worst case.

The optimal (re) transmission probability would be based on the exact packet traffic that needs to be retransmitted for the next access slot. However, this would cause substantial implementation complexity. Under current UMTS specifications, it remains impossible.

The sub-optimal case that guarantees the system stability would be CASE C. In CASE C, the new packet traffic for next access slot is conservatively estimated by assuming all the current packet traffic sustains. This effectively assigns a smaller (re) transmission probability to the packet users than that in optimal case. The smaller probability causes a smaller amount of packet traffic on packet channel, hence ensures the system stability.

The sub-optimal approach is also practical in that it does not require packet traffic estimate accuracy; therefore it does not result in implementation complexity. In addition, it simplifies the persistency control algorithm and is fully supported by the UMTS specification. This is the approach preferred in this invention. The method of the present invention provides the following algorithm.

For simplicity, only packet transmission on RACH is considered. The result for the packet transmission on RACH can be adopted easily to CPCH transmission.

According to both Feature 1 and Feature 2, $P_{total}$ is the total received power (TRP) measurement including the signal power from both packet Transport Channels and circuit traffic Dedicated Transport Channel. Therefore $$\alpha_{packet} \cdot P_{total}$$

is power from Uplink packet transport channel (RACH/CPCH) traffic and $$(1-\alpha_{packet}) \cdot P_{total}$$

is power from Uplink DCH traffic (intercell interference and thermal noise are assumed to be part of DCH traffic, cf. Feature 2).

Let $P_{RACH}$ be the target power when the packet transmission on RACH reaches BTS. Feature 3 assumes that RACH packets are received at the same target power $P_{RACH}$. According to Feature 1 and Feature 2, $P_{total}$ can be calculated. The number of RACH attempts made by all the active users when the measurement is performed is $$\overline{N}_{CURRENT} = \frac{\alpha_{packet} \cdot P_{total}}{P_{RACH}}$$

As Wideband CDMA system is a power-interference limited system, the total transmission power in a cell is controlled in such away that it won't cause degrading interference to its neighbor cells. In other word, there should be an 'alerting threshold' for allowed total interference level received at BTS side. When this 'alerting threshold' is reached, the system has to warn its mobile users not to make any more transmissions. Let the allowed 'alerting' UL load threshold level is given as $$P_{total}^{MAX} = \text{function}(\alpha_{max})$$

Obviously, $P_{total}^{MAX}$ is a system design parameter. It can be derived from the maximum cell load $\alpha_{max}$. As long as the following relation $$P_{total} > P_{total}^{MAX}$$

holds, it will be possible to allow more packets to be transmitted on the packet channel.

According to Feature 5, transmission power from the on-going DCH users is closed loop controlled and is measured as $$(1-\alpha_{packet}) \cdot P_{total}$$

As a homogeneous traffic pattern is assumed in Feature 5, according to Feature 4 and Feature 5 the 'surplus' power $$P_{total}^{MAX} - P_{total}$$

will be maintained for the next packet transmission. The ultimate case is that all the 'surplus' power is consumed by all the newly arrived packet transmission. The number of new packets that can be allowed for transmission is given as $$\overline{N}_{NEXT} = \frac{P_{total}^{MAX} - P_{total}}{P_{RACH}}$$

According to Feature 7, both backlogged users and new users will listen to the broadcast channel and pick up the persistency probability. They will re-transmit (if they are backlogged users) and transmit (if they are new users) with the same transmission probability. Let p be the normalised transmission probability for every access channel. According to Feature 8, p is calculated as $$p = \frac{1}{\overline{N}_{CURRENT} + \overline{N}_{NEXT}} = \frac{P_{RACH}}{P_{total}^{MAX} + (1-\alpha_{packet})P_{total}}$$

Note that p is a normalized persistency probability per access channel, e.g., per/access slot/code. The overall persistency probability $P_{OVERALL}$ is given as $$P_{OVERALL} = n \cdot p$$

n is total access channel available for the packet transmission. It is also a system parameter, decided by the number of access slot and number of codes available.

Figure 4:
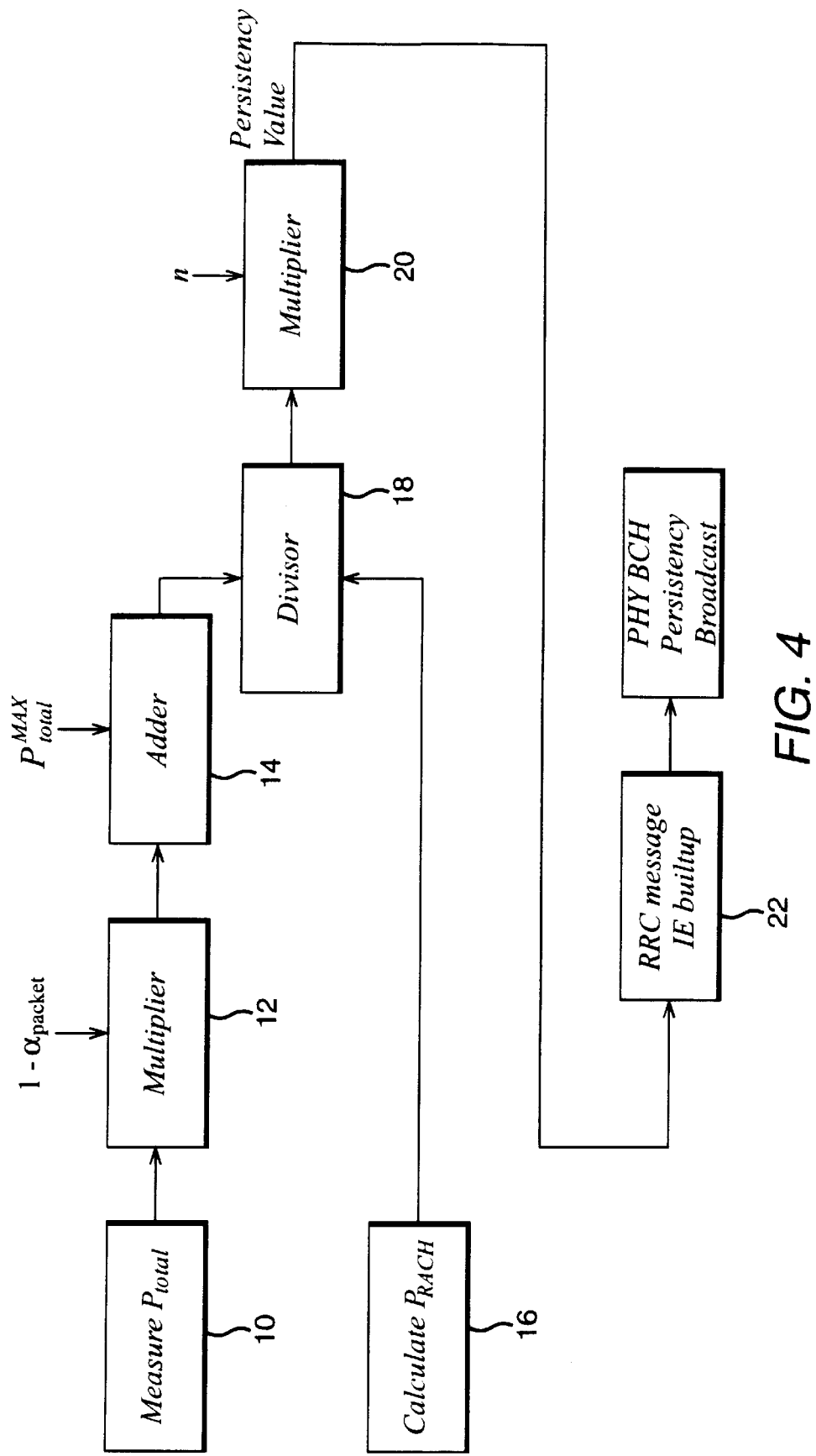
FIG. 4 is a block diagram of a preferred form of apparatus according to the invention.

The preferred embodiment provides apparatus for implementing the above algorithm as shown in FIG. 4. A user equipment measured current transmission power $P_{total}$ is provided as at 10, and a multiplier device 12 multiplies this value by a value to derive the product $(1-\alpha_{packet}) \cdot P_{total}$. An adder device 14 adds to this product the maximum cell load value $P_{total}^{MAX}$. Each packet is controlled to have the same power $P_{RACH}$, and this value is provided at 16. This value is presented to a divider device 18 which divides this value $P_{RACH}$ by the sum from adder device 14 to give the persistency value p, as set out above. An overall persistency value $P_{OVERALL}$ is then derived in a multiplier 20 by multiplying the value p by the value n, n being the total access channels available for packet transmission.

The block diagram of FIG. 4 is for implementing the algorithm at UMTS Terrestrial Radio Access Network (UTRAN) side. After persistency has been calculated, the value is fed to Radio Resource Control (RRC) layer 22. The RRC layer 22 will build up RRC message that contains the persistency value as a Message Information Element (IE). At mobile terminal (UE) side a random draw is made and the mobile terminal will decide if it (re)transmits the packet by comparing a random number with the persistency value that is received from the broadcast control channel (BCH).

We claim:

1. In a mobile telecommunications system, a method of determining a persistency value for making random transmissions for access to the system, the method comprising:

a. determining for a system cell, the maximum allowable user equipment transmission power $P^{MAX}$; characterized by:

b. assessing the number in, a current time interval, of ongoing packet transmissions $N_{CURRENT}$ based upon a fraction $\alpha$ of user equipment measured current transmission power $P_{total}$;

c. assessing the power available in a next time interval based upon the maximum allowable transmission power and the current transmission power, and determining therefrom a number of allowable new packets $N_{NEXT}$ in the next time interval; and d. determining a persistency value p for transmission to user equipment in said cell, p being a function of the number of ongoing packet transmissions $N_{CURRENT}$ and the number of allowable new packets $N_{NEXT}$, wherein an overall persistency probability $p_{overall}$ is transmitted over the system cell, $p_{overall}$ being determined as the product of said persistency value p and a number n of total access channels available for packet transmission.

2. A method according to claim 1 wherein said persistency value p is determined on the assumption that all said ongoing packet transmissions $N_{CURRENT}$ will continue in the next time interval.

3. A method according to claim 2, wherein said persistency value p is determined on the assumption that all said current number ongoing packet transmissions $N_{CURRENT}$ and all said number of allowable new packets $N_{NEXT}$ have an equal possibility of transmission.

4. A method according to claim 3, wherein the persistency value p is equal to the inverse of the sum of said number in a current time interval of ongoing packet transmissions $N_{CURRENT}$ and said number of allowable new packets $N_{NEXT}$.

5. A method according to any preceding claim, wherein the number of ongoing packet transmissions $N_{CURRENT}$ is determined on the assumption that each packet is controlled to have the same power $P_{RACH}$, whereby $N_{CURRENT} = \alpha \cdot P_{total}/P_{RACH}$.

6. A method according to claim 5, wherein the number of allowable new packets $N_{NEXT}$ is determined on the assumption that each packet has the same power $P_{RACH}$, whereby $N_{NEXT} = (P^{MAX} - P_{total})/P_{RACH}$.

7. A method according to claims 4, wherein the persistency value p is given by $P_{RACH}(P^{MAX} + (1-\alpha) \cdot P_{total})^{-1}$.

8. In a Universal Mobile Telecommunications System, a method of determining a persistency value for making random transmissions for access to the system, the method being as claimed in claim 1, and wherein user equipment measured current transmission power $P_{total}$ includes power from both packet Transport Channels ($\alpha \cdot P_{total}$) and power from circuit traffic Dedicated Transport Channels(($1-\alpha$). $P_{total}$).

9. A method as claimed in claim 8, wherein the values determined as set forth are determined on the assumption that packet preamble length is much shorter than its message part and does not contribute significantly to measured power values.

10. In a mobile telecommunications system, apparatus for determining a persistency value for making random transmissions for access to the system, the apparatus comprising:

means for determining for a system cell, the maximum allowable user equipment transmission power $P^{MAX}$; and means (10) for measuring user equipment current transmission power $P_{total}$; characterised by means for assessing the number in a current time interval of ongoing packet transmissions $N_{CURRENT}$ based upon a fraction $\alpha$ of measured current transmission power $P_{total}$;

means for assessing the power available in a next time interval based upon the maximum allowable transmission power and the current transmission power, and determining therefrom a number of allowable new packets $N_{NEXT}$ in the next time interval; and means (12–18) for determining a persistency value p for transmission to user equipment in said cell, being a function of the number of ongoing packet transmissions $N_{CURRENT}$ and said number of allowable new packets $N_{NEXT}$, including means (20) for multiplying the determined persistency value p by a number n of total access channels available for packet transmission to provide an overall persistency probability $P_{OVERALL}$ for transmission.

11. Apparatus according to claim 10, wherein said means for determining said persistency value p is operative on the assumption that all said ongoing packet transmissions $N_{CURRENT}$ will continue in the next time interval.

12. Apparatus according to claim 10, wherein said means for determining said persistency value p is operative on the assumption that all said ongoing packet transmissions $N_{CURRENT}$ and all said number of allowable new packets $N_{NEXT}$ have an equal possibility of transmission.

13. Apparatus according to claim 12, including means for determining the persistency value p from the inverse of the sum of said number of ongoing packet transmissions $N_{CURRENT}$ and said number of allowable new packets $N_{NEXT}$.

14. Apparatus according to claim 13, wherein said means for determining the persistency value p is operative on the assumption that each packet is controlled to have the same power $P_{RACH}$, wherein the number of said number in a current time interval of ongoing packet transmissions $N_{CURRENT}$ is determined as $N_{CURRENT} = \alpha \cdot P_{total}/P_{RACH}$.

15. Apparatus according to claim 13, wherein said means for determining the persistency value p is operative on the assumption that each packet is controlled to have the same power $P_{RACH}$, whereby the number of allowable new packets $N_{NEXT} = (P^{MAX} - P_{total})/P_{RACH}$.

16. Apparatus according to any one of claims 13–15, arranged to compute the persistency value p given by $P_{RACH}(P^{MAX} + (1\alpha) \cdot P_{total})^{-1}$.

17. Apparatus according to claim 16, including means (12) for multiplying the measured current transmission power $P_{total}$ by a value $(1-\alpha)$, means (14) for adding to this product the value of the maximum allowable power transmission $P^{MAX}$, and means (18) for dividing by this sum a packet power value $P_{RACH}$.

* * * * *